United States Patent
Chin et al.

(10) Patent No.: US 12,529,284 B2
(45) Date of Patent: Jan. 20, 2026

(54) ELECTROMAGNETIC ATTRACTION ON THE FLOW SLEEVE OF TRSVS

(71) Applicant: Halliburton Energy Services, Inc., Houston, TX (US)

(72) Inventors: Chun Hwee Chin, Singapore (SG); Bruce Edward Scott, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 164 days.

(21) Appl. No.: 17/900,927

(22) Filed: Sep. 1, 2022

(65) Prior Publication Data
US 2024/0076955 A1    Mar. 7, 2024

(51) Int. Cl.
*E21B 34/06* (2006.01)
*E21B 34/16* (2006.01)
*F16K 31/08* (2006.01)

(52) U.S. Cl.
CPC ............ *E21B 34/066* (2013.01); *E21B 34/16* (2013.01); *E21B 2200/05* (2020.05); *E21B 2200/06* (2020.05); *F16K 31/08* (2013.01)

(58) Field of Classification Search
CPC .............. E21B 34/066; E21B 2200/05; E21B 2200/06; F16K 31/08
See application file for complete search history.

(56) References Cited

U.S. PATENT DOCUMENTS

| | | | | |
|---|---|---|---|---|
| 3,032,111 | A * | 5/1962 | Corley, Jr. | E21B 34/16 166/149 |
| 4,356,867 | A | 11/1982 | Carmody | |
| 6,003,605 | A * | 12/1999 | Dickson | E21B 34/10 251/303 |
| 8,353,353 | B2 | 1/2013 | Reaux | |
| 8,464,799 | B2 * | 6/2013 | Scott | E21B 34/16 166/373 |
| 9,291,033 | B2 | 3/2016 | Scott et al. | |
| 10,472,929 | B2 | 11/2019 | Miller et al. | |

(Continued)

FOREIGN PATENT DOCUMENTS

| | | |
|---|---|---|
| EP | 1898045 A1 | 3/2008 |
| WO | 2011062867 A2 | 5/2011 |

(Continued)

*Primary Examiner* — Neel Girish Patel
(74) *Attorney, Agent, or Firm* — Scott Richardson; Parker Justiss, P.C.

(57) ABSTRACT

Provided is a subsurface safety valve (SSSV), a well system, and a method. The subsurface safety valve (SSSV), in one aspect, includes an outer housing, a valve closure mechanism coupled to the outer housing, and a bore flow management actuator disposed in the central bore, the bore flow management actuator configured to slide from a first state to a second state to move the valve closure mechanism between a closed state and an open state. The subsurface safety valve (SSSV), in this aspect, additionally includes an electromagnet positioned at: 1) a first location, the first location in the outer housing proximate where the bore flow management actuator resides when the bore flow management actuator is in the second state; or 2) a second location, the second location coupled proximate a downhole end of the bore flow management actuator.

30 Claims, 11 Drawing Sheets

(56) References Cited

U.S. PATENT DOCUMENTS

| | | | |
|---|---|---|---|
| 11,732,551 B1* | 8/2023 | Tang | E21B 34/14 |
| | | | 166/373 |
| 11,851,961 B1* | 12/2023 | Passmore | E21B 43/12 |
| 11,939,837 B2* | 3/2024 | Wood | F16D 11/16 |
| 2002/0108747 A1* | 8/2002 | Dietz | E21B 34/066 |
| | | | 166/66.4 |
| 2008/0157014 A1* | 7/2008 | Vick, Jr. | F16K 31/086 |
| | | | 251/65 |
| 2009/0032238 A1 | 2/2009 | Rogers et al. | |
| 2009/0071654 A1 | 3/2009 | O'Malley et al. | |
| 2009/0205833 A1* | 8/2009 | Bunnell | E21B 34/16 |
| | | | 166/57 |
| 2010/0294502 A1 | 11/2010 | Xu | |
| 2011/0088907 A1* | 4/2011 | Xu | F16K 31/084 |
| | | | 166/332.8 |
| 2011/0120727 A1* | 5/2011 | Lake | F16K 31/082 |
| | | | 166/66.7 |
| 2011/0186303 A1* | 8/2011 | Scott | E21B 34/08 |
| | | | 166/373 |
| 2012/0118582 A1* | 5/2012 | Soni | E21B 23/0413 |
| | | | 166/66.5 |
| 2012/0125597 A1* | 5/2012 | Vick, Jr. | E21B 34/066 |
| | | | 166/321 |
| 2013/0341034 A1* | 12/2013 | Biddick | F16K 31/06 |
| | | | 166/373 |
| 2014/0020904 A1* | 1/2014 | Hill, Jr | E21B 34/12 |
| | | | 166/332.8 |
| 2016/0265309 A1* | 9/2016 | Vick, Jr. | F16K 31/1221 |
| 2018/0202261 A1* | 7/2018 | Scott | E21B 34/16 |
| 2018/0328111 A1* | 11/2018 | Ross | E21B 4/006 |
| 2018/0334883 A1* | 11/2018 | Williamson | E21B 34/102 |
| 2018/0355698 A1* | 12/2018 | Williamson | E21B 34/16 |
| 2019/0170269 A1* | 6/2019 | Oulton | E21B 23/004 |
| 2019/0316440 A1* | 10/2019 | Honeker | E21B 47/07 |
| 2020/0032616 A1* | 1/2020 | Vick, Jr. | E21B 34/14 |
| 2020/0095843 A1* | 3/2020 | Vick, Jr. | F16K 5/08 |
| 2020/0270965 A1* | 8/2020 | Vick, Jr. | F16K 1/2007 |
| 2020/0308932 A1* | 10/2020 | Vick, Jr. | E21B 34/14 |
| 2021/0108487 A1* | 4/2021 | Vick, Jr. | E21B 23/04 |
| 2021/0396095 A1* | 12/2021 | Roth | E21B 34/14 |
| 2023/0018892 A1* | 1/2023 | Chouzenoux | E21B 34/14 |
| 2023/0399919 A1* | 12/2023 | Passmore | E21B 34/08 |
| 2024/0175335 A1* | 5/2024 | Chouzenoux | E21B 34/16 |

FOREIGN PATENT DOCUMENTS

| | | |
|---|---|---|
| WO | 2015094168 A1 | 6/2015 |
| WO | 2020041056 A1 | 2/2020 |
| WO | 2021173684 A1 | 9/2021 |

* cited by examiner

ELECTROMAGNETIC ATTRACTION ON THE FLOW SLEEVE OF TRSVS

BACKGROUND

Subsurface safety valves (SSSVs) are well known in the oil and gas industry and provide one of many failsafe mechanisms to prevent the uncontrolled release of subsurface production fluids, should a wellbore system experience a loss in containment. In certain instances, SSSVs comprise a portion of a tubing string, the entirety of the SSSVs being set in place during completion of a wellbore. In other instances, the SSSVs are wireline deployed/retrieved. Although a number of design variations are possible for SSSVs, the vast majority are flapper-type valves that open and close in response to longitudinal movement of a flow tube.

Since SSSVs provide a failsafe mechanism, the default positioning of the flapper valve is usually closed in order to minimize the potential for inadvertent release of subsurface production fluids. The flapper valve can be opened through various means of control from the earth's surface in order to provide a flow pathway for production to occur. What is needed in the art is an improved SSSV that does not encounter the problems of existing SSSVs.

BRIEF DESCRIPTION

Reference is now made to the following descriptions taken in conjunction with the accompanying drawings, in which.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

The present disclosure has acknowledged that offshore wells are being drilled at ever increasing water depths and in environmentally sensitive waters, and thus safety valves (e.g., including subsurface safety valves (SSSVs)) are necessary. The present disclosure has further acknowledged that SSSVs have inherent problems, and thus from time to time need servicing. Unfortunately, the servicing of the SSSVs requires the primary control system thereof to be switched off (e.g., hydraulic pressure to be cut to hydraulically controlled SSSVs or the electricity to be cut to electrically controlled SSSVs), causing the valve closure mechanism to close, and therefore production to cease. If the operator of the well desires to continue production while servicing the SSSV, the pressure/electricity in the primary control system has to be locked in. Unfortunately, due to safety concerns, locking the pressure/electricity to hold the valve closure mechanism open is typically not a viable option.

Based, at least in part, on the foregoing acknowledgments and recognitions, the present disclosure has developed an SSSV that addresses the foregoing concerns. Specifically, the present disclosure has developed an SSSV that employs an electromagnet on a separate safety control circuit as the primary control system. This electromagnet and separate safety control circuit allow the bore flow management actuator to be held in its extended position (e.g., and thus the valve closure mechanism being held in its open state) when the primary control system is being serviced. Similarly, if a problem were to arise wherein it was necessary for the SSSV to quickly close, or alternatively the separate control circuit were to be damaged and/or cut, the power supplied to the electromagnet would cease, and thus a return spring coupled to the bore flow management actuator would return the bore flow management actuator to its non-extended position (e.g., allowing the valve closure mechanism to return to its closed state), thereby stopping production and closing in the well.

Figure 1:
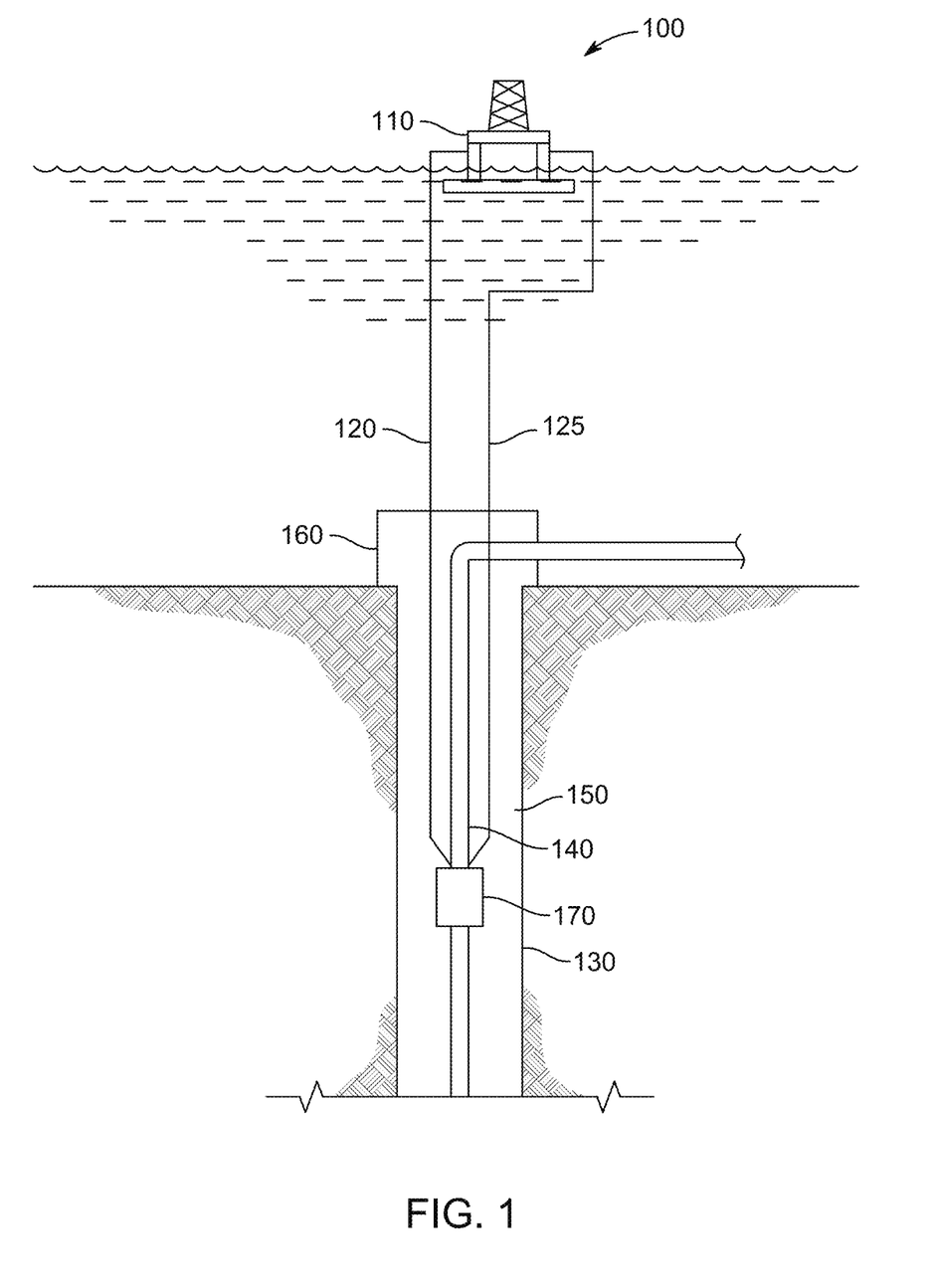
FIG. 1 illustrates a well system 100 designed, manufactured and/or operated according to one or more embodiments of the disclosure.

FIG. 1 illustrates a well system 100 designed, manufactured and/or operated according to one or more embodiments of the disclosure. The well system 100, in at least one embodiment, includes an offshore platform 110 connected to an SSSV 170 via a primary control circuit 120 (e.g., hydraulic control line, electrical control line, etc. coupled to a primary control system of the SSSV 170) and separate safety control circuit 125 (e.g., electrical control line coupled to a safety control system of the SSSV 170). An annulus 150 may be defined between walls of a wellbore 130 and a conduit 140. A wellhead 160 may provide a means to hand off and seal conduit 140 against the wellbore 130 and provide a profile to latch a subsea blowout preventer to. Conduit 140 may be coupled to the wellhead 160. Conduit 140 may be any conduit such as a casing, liner, production tubing, or other oilfield tubulars disposed in a wellbore.

Figure 2A:
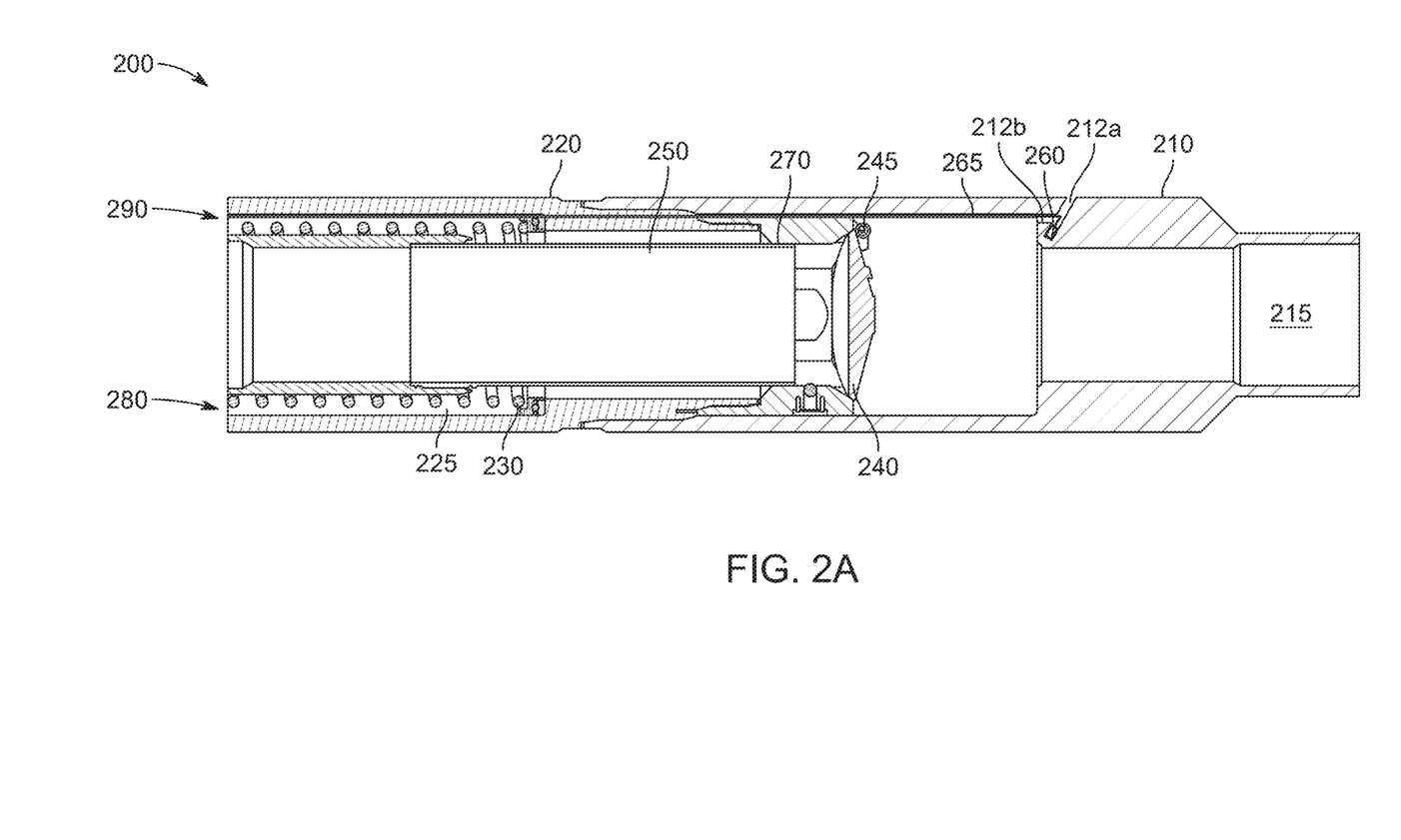
FIGS. 2A and 2B illustrate one embodiment of an SSSV designed, manufacture and/or operated according to one or more embodiments of the disclosure.
Figure 2B:
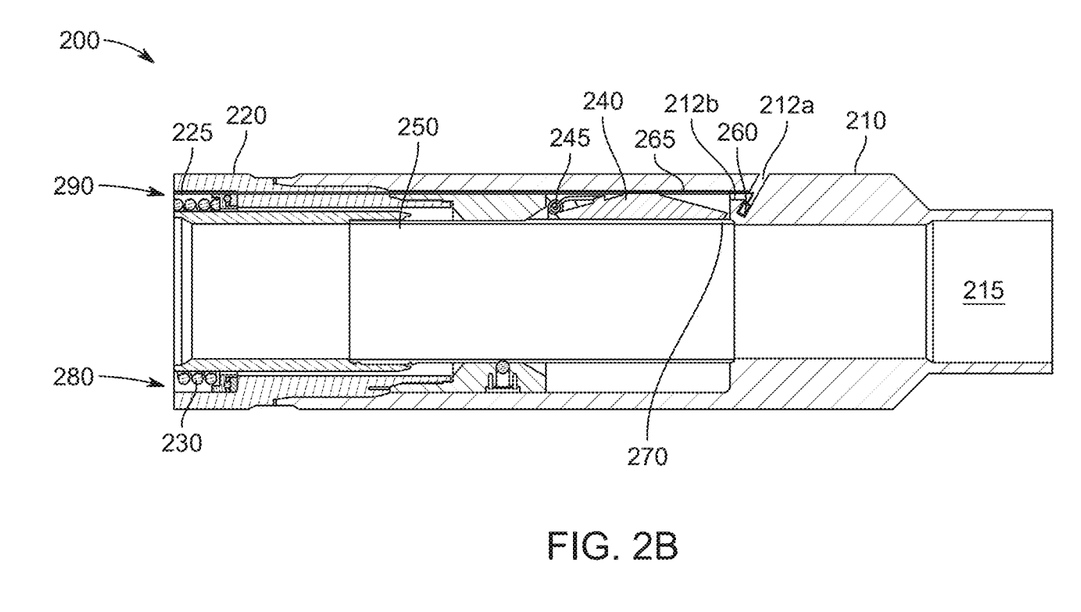

The SSSV 170, or at least a portion thereof, may be interconnected in conduit 140 and positioned in the wellbore 130. Although the well system 100 is depicted in FIG. 1 as an offshore well system, one of ordinary skill should be able to adopt the teachings herein to any type of well, including onshore or offshore. The primary control circuit 120 may extend into the wellbore 130 and may be connected to the SSSV 170. The primary control circuit 120 may provide actuation power to the SSSV 170. As will be described in further detail below, power may be provided to the SSSV 170 to actuate or de-actuate the SSSV 170. Actuation may comprise opening the SSSV 170 to provide a flow path for subsurface production fluids to enter conduit 140, and de-actuation may comprise closing the SSSV 170 to close a flow path for subsurface production fluids to enter conduit 140. While the embodiment of FIG. 1 illustrates only a single SSSV 170, other embodiments exist wherein multiple SSSVs 170 according to the disclosure are used. Moreover, while not shown in the embodiment of FIG. 1, a tubing retrievable surface valve (TRSV) or wirelines retrievable surface valve (WRSV) may be positioned downhole of the SSSV 170, and may also employ one or more of the novel features disclosed herein Turning to FIGS. 2A and 2B, illustrated is one embodiment of an SSSV 200 designed, manufacture and/or operated according to one or more embodiments of the disclosure. FIG. 2A illustrates the SSSV 200 in the closed state, whereas FIG. 2B illustrates the SSSV 200 in the open state. The SSSV 200, in the illustrated embodiment, includes an outer housing 210 including a central bore 215 extending axially through the outer housing 210. The central bore 215, in the illustrated embodiment, is operable to convey subsurface production fluids there through, and thus up to a surface of a wellbore.

The SSSV 200, in the illustrated embodiment, further includes a spring housing 220. The spring housing 220, in one or more embodiments, includes a bore 225. Positioned in the bore 225, in the illustrated embodiment, is a spring 230. In at least one embodiment, not shown, the outer housing 210 and the spring housing 220 are a single unitary housing. However, in other embodiments, such as shown, the outer housing 210 and the spring housing 220 are separate but connected housings.

The SSSV 200, in the illustrated embodiment, further includes a valve closure mechanism 240 coupled to the outer housing 210 within the central bore 215. The valve closure mechanism 240 may take various different types and/or shapes. Nevertheless, in the embodiment of FIGS. 2A and 2B the valve closure mechanism 240 is a flapper type valve closure mechanism. In at least one embodiment, the valve closure mechanism includes a closure spring 245 configured to bias the valve closure mechanism 240 from its open state (e.g., as shown in FIG. 2B) toward its closed state (e.g., as shown in FIG. 2A).

The SSSV 200, in the illustrated embodiment, additionally includes a bore flow management actuator 250 disposed in the central bore 215. In one or more embodiments, the bore flow management actuator 250 is configured to slide from a first state (e.g., as shown in FIG. 2A) to a second state (e.g., as shown in FIG. 2B) to move (e.g., prop) the valve closure mechanism 240 between the closed state (e.g., as shown in FIG. 2A) and the open state (e.g., as shown in FIG. 2B). The bore flow management actuator 250, in the illustrated embodiment, is coupled to the spring 230. Accordingly, the spring 230 may be used to return the bore flow management actuator 250 to the first state (and thus allow the valve closure mechanism 240 to return to its closed state).

The SSSV 200, in the illustrated embodiment, additionally includes an electromagnet 260. The electromagnet 260, in one or more embodiments, is either located at a first location in the outer housing 210 proximate where the bore flow management actuator 250 resides when the bore flow management actuator 150 is in the second state (e.g., as shown in FIG. 2B), or alternatively is located at a second location coupled proximate a downhole end of the bore flow management actuator 250. In the embodiment of FIGS. 2A and 2B, the electromagnet 260 is located in the first location in the outer housing 210 proximate where the bore flow management actuator 250 resides when it is in its second state. Other embodiments will be discussed below wherein the electromagnet 260 is located in the second location.

Further to the embodiment of FIGS. 2A and 2B, the outer housing 210 includes cross-matched bores, a first bore 212a of which extends from an outer surface of the outer housing 210 toward the first location, and a second bore 212b of which extends from the central bore 215 thereby crossing the first bore 212a. In the illustrated embodiment, the electromagnet 260 is located proximate a termination of the first bore 212a, and an electric line 265 coupled to the electromagnet 260 extends through the second bore 212b to provide electric current to the electromagnet 260. Further to the embodiment of FIGS. 2A and 2B, the electric line 265 extends along a space between an outside diameter of the spring 230 and the bore 225.

The SSSV 200, in at least one embodiment, further includes a permanent magnet/ferromagnet 270 positioned at the other of the second location or the first location. The permanent magnet/ferromagnet 270, in at least one embodiment, is configured to engage with the electromagnet 260 to keep the bore flow management actuator 250 at the second state when the electromagnet 260 is energized, even if power (e.g., hydraulic or electric power) is lost to the bore flow management actuator 250. In the embodiment of FIGS. 2A and 2B, the electromagnet 260 is located at the first location, and thus the permanent magnet/ferromagnet 270 is located at the second location. Nevertheless, as will be discussed further below, the opposite could hold true.

For example, in the embodiment of FIGS. 2A and 2B, a wall thickness of the bore flow management actuator 250 may be increased (e.g., reducing the ID of the bore flow management actuator 250). With this increased wall thickness, an opening may be formed (e.g., drilled) in the wall thickness from the uphole end of the bore flow management actuator 250 toward to the downhole end thereof. Accordingly, the permanent magnet/ferromagnet 270 may be insert within this opening, thus placing it at the second location as discussed above.

In the embodiment of FIGS. 2A and 2B, the electromagnet 260 is a single discrete electromagnet. Similarly, the permanent magnet/ferromagnet 270 is a single discrete permanent magnet/ferromagnet. In such embodiments, the single discrete electromagnet and the single discrete permanent magnet/ferromagnet should at least partially radially align. In certain embodiments, however, the electromagnet 260 radially extends at least 180 degrees about the outer housing 210 or the bore flow management actuator 250 (e.g., depending on whether it is at the first location or the second location). In certain other embodiments, the electromagnet 260 radially extends 360 degrees about the outer housing 210 or the bore flow management actuator 250 (e.g., depending on whether it is at the first location or the second location). In even yet other embodiments, the electromagnet 260 is a first electromagnet, and the SSSV 200 additionally includes one or more additional circumferentially spaced electromagnets. In such an embodiment, the SSSV 200 might include matching permanent magnet/ferromagnets, or alternatively a single discrete larger permanent magnet/ferromagnet.

The SSSV 200, in one or more embodiments, may include a primary control system 280. The primary control system 280, in the illustrated embodiment, is configured to slide the bore flow management actuator 250 from the first state (e.g., as shown in FIG. 2A) to the second state (e.g., as shown in FIG. 2B) when the primary control system 280 receives a primary signal from a primary control circuit. In at least one embodiment, the primary control system 280 is a hydraulic primary control system, the primary control circuit is a hydraulic primary control circuit, and the primary signal is a hydraulic primary signal. In one or more other embodiments, the primary control system 280 is an electric primary control system, the primary control circuit is an electric primary control circuit, and the primary signal an electric primary signal.

The SSSV 200, in one or more embodiments, may additionally include a safety control system 290. The safety control system 290, in one or more embodiments, is on a separate safety control circuit from the primary control circuit. Accordingly, the primary control circuit and safety control circuit may operate independent of one another. The safety control system 290, along with the electromagnet 260, is configured to keep the bore flow management actuator 250 at the second state when the electromagnet 260 is energized and the primary control circuit is inoperable. The term "inoperable" as used herein, is intended to encompass all situations wherein the primary control system 280 and/or the primary control circuit fail to keep the bore flow management actuator at the second state. Thus, the term "inoperable" includes those situations wherein the primary control system 280 and/or the primary control circuit are turned off, or alternatively wherein the primary control system 280 and/or the primary control circuit are being serviced.

Figure 3A:
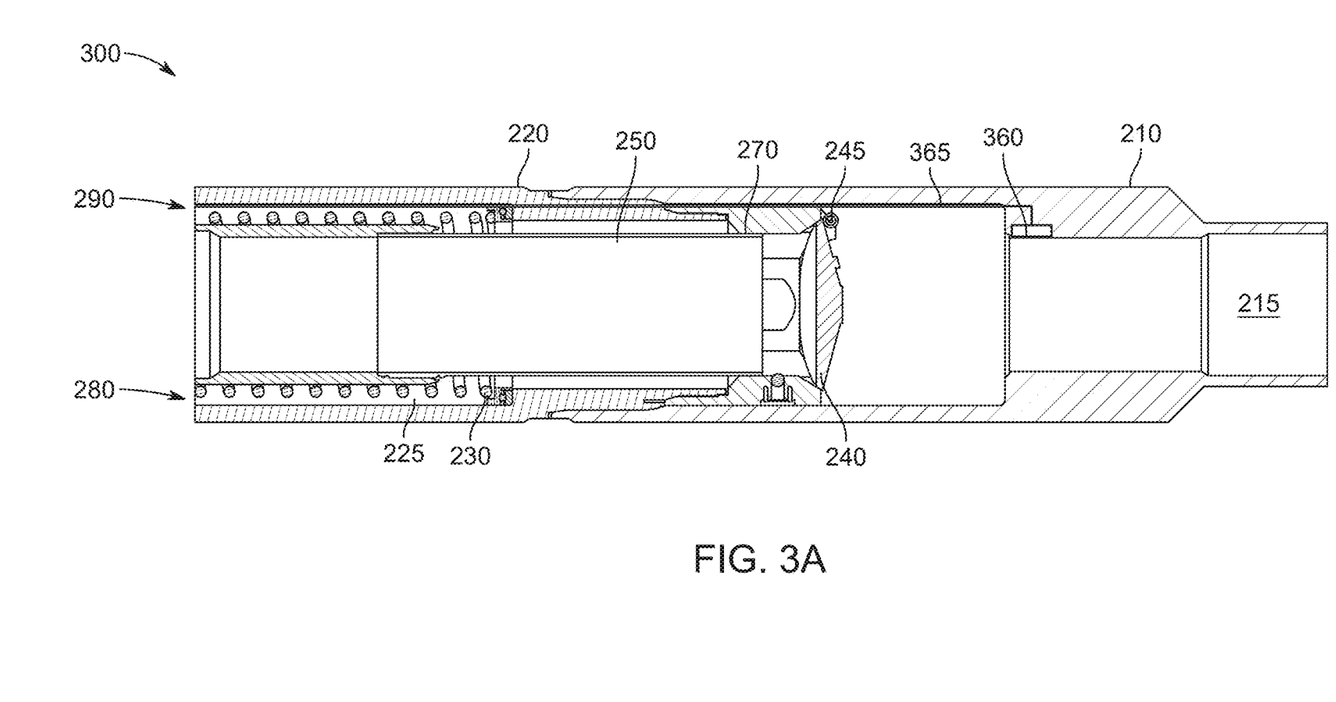
FIGS. 3A and 3B illustrate one embodiment of an SSSV designed, manufactured and/or operated according to one or more alternative embodiments of the disclosure.
Figure 3B:
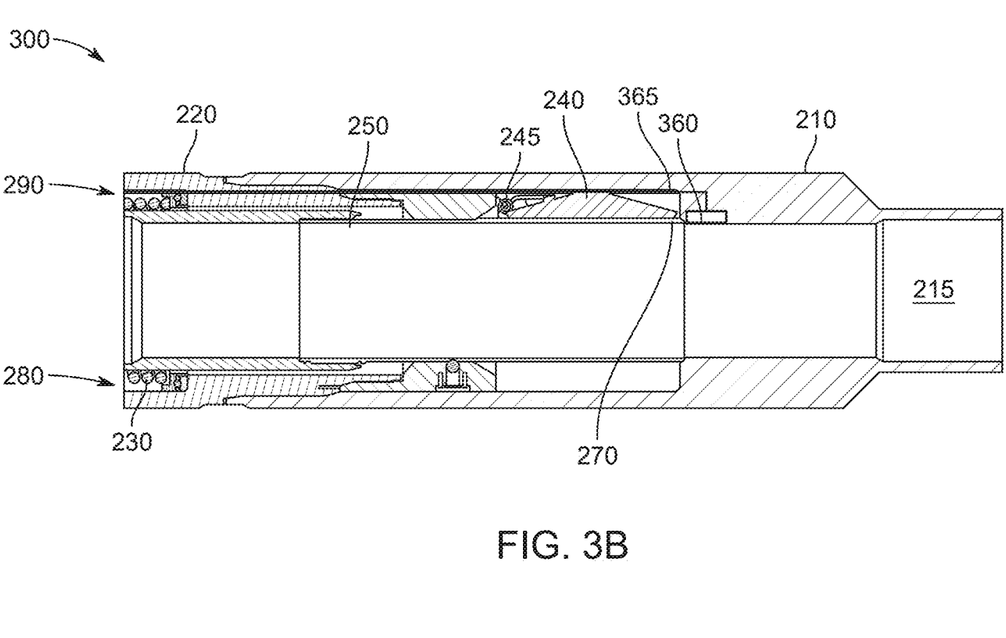

Turning to FIGS. 3A and 3B, illustrated is one embodiment of an SSSV 300 designed, manufactured and/or operated according to one or more alternative embodiments of the disclosure. The SSSV 300 is similar in many respects to the SSSV 200. Accordingly, like reference numbers have been used to indicate similar, if not identical, features. The SSSV 300 differs, for the most part, from the SSSV 200 in that the electromagnet 360 and electric line 365 are not located in cross-matched bores. Alternatively, the SSSV 300 of FIGS. 3A and 3B inserts its electromagnet 360 within a slot formed in the central bore 215, and then feeds its electric line 365 into contact with the electromagnet 360. In the embodiment of FIGS. 3A and 3B, each of the electromagnet 360 and permanent magnet/ferromagnet 270 are non-annular, and thus do not extend 360 degrees about the outer housing 210 or the bore flow management actuator 250.

Figure 4A:
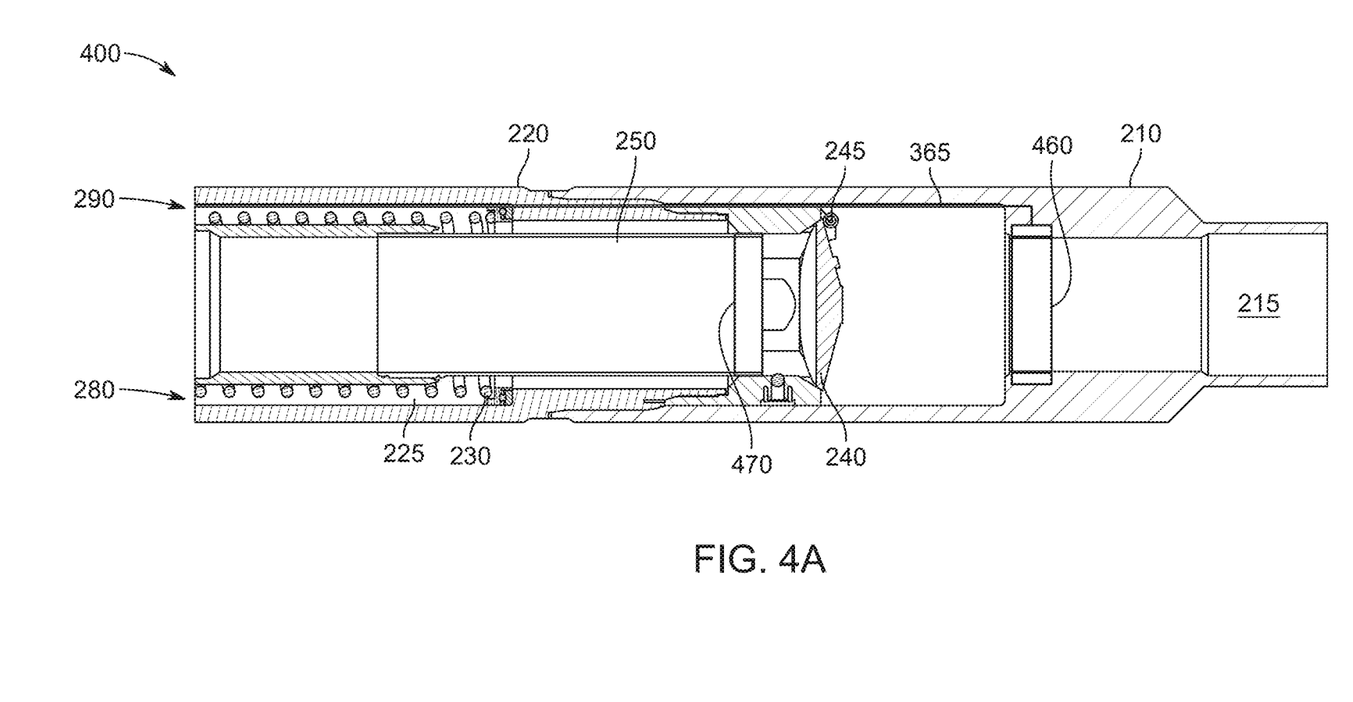
FIGS. 4A and 4B illustrate one embodiment of an SSSV designed, manufactured and/or operated according to one or more alternative embodiments of the disclosure.
Figure 4B:
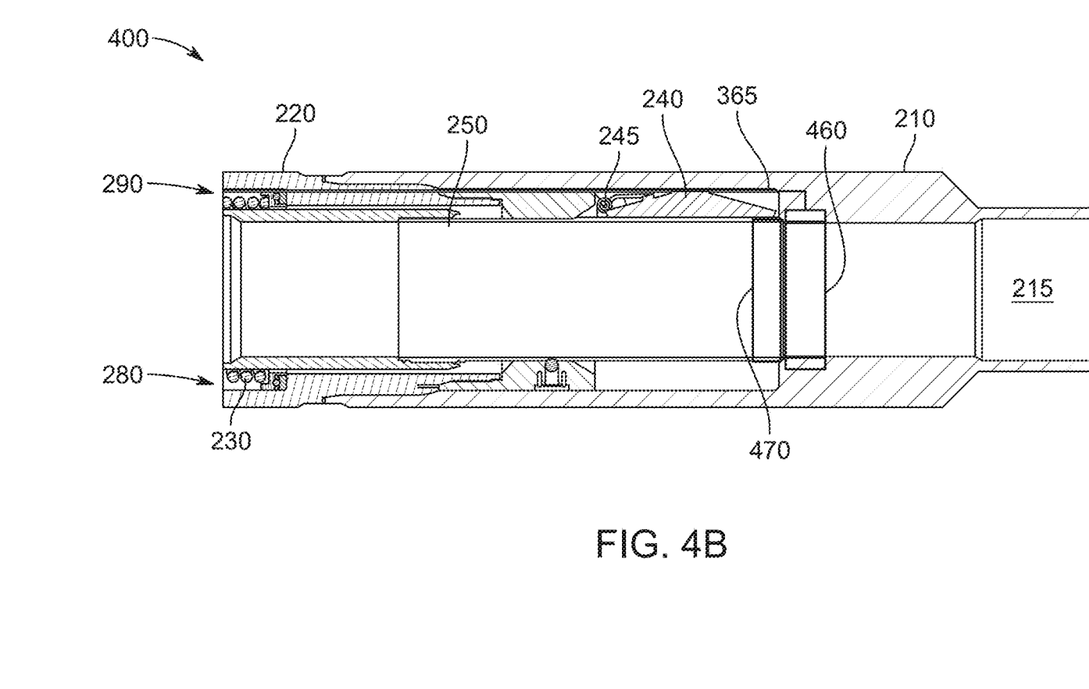

Turning to FIGS. 4A and 4B, illustrated is one embodiment of an SSSV 400 designed, manufactured and/or operated according to one or more alternative embodiments of the disclosure. The SSSV 400 is similar in many respects to the SSSV 300. Accordingly, like reference numbers have been used to indicate similar, if not identical, features. The SSSV 400 differs, for the most part, from the SSSV 300 in that the electromagnet 460 and/or permanent magnet/ferromagnet 470 radially extend at least 180 degrees about the outer housing 210 or the bore flow management actuator 250. In one or more embodiments, such as shown, the electromagnet 460 and/or permanent magnet/ferromagnet 470 radially extend 360 degrees about the outer housing 210 or the bore flow management actuator 250.

Figure 5:
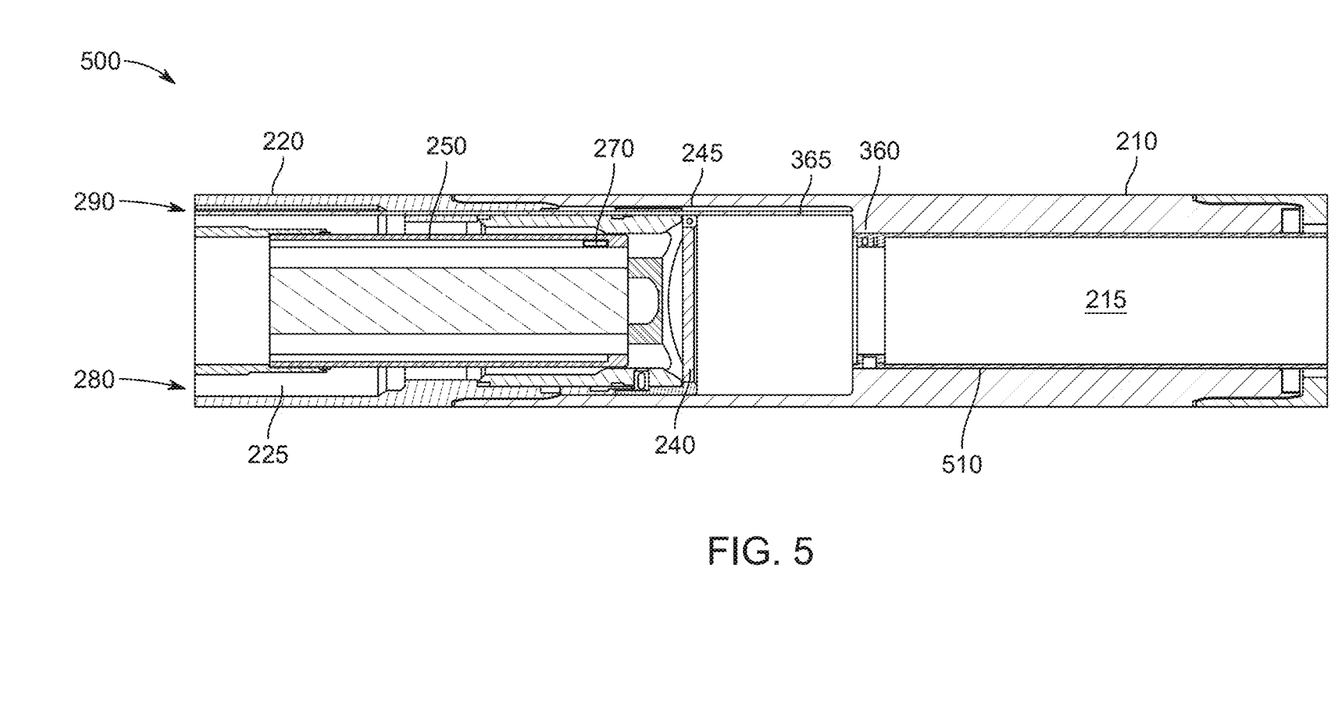
FIG. 5 illustrates one embodiment of an SSSV designed, manufactured and/or operated according to one or more alternative embodiments of the disclosure.

Turning to FIG. 5, illustrated is an SSSV 500 designed, manufactured and/or operated according to one or more alternative embodiments of the disclosure. The SSSV 500 is similar in many respects to the SSSV 300. Accordingly, like reference numbers have been used to indicate similar, if not identical, features. The SSSV 500 differs, for the most part, from the SSSV 300 in that the SSSV 500 includes a lockout sleeve 510.

Figure 6:
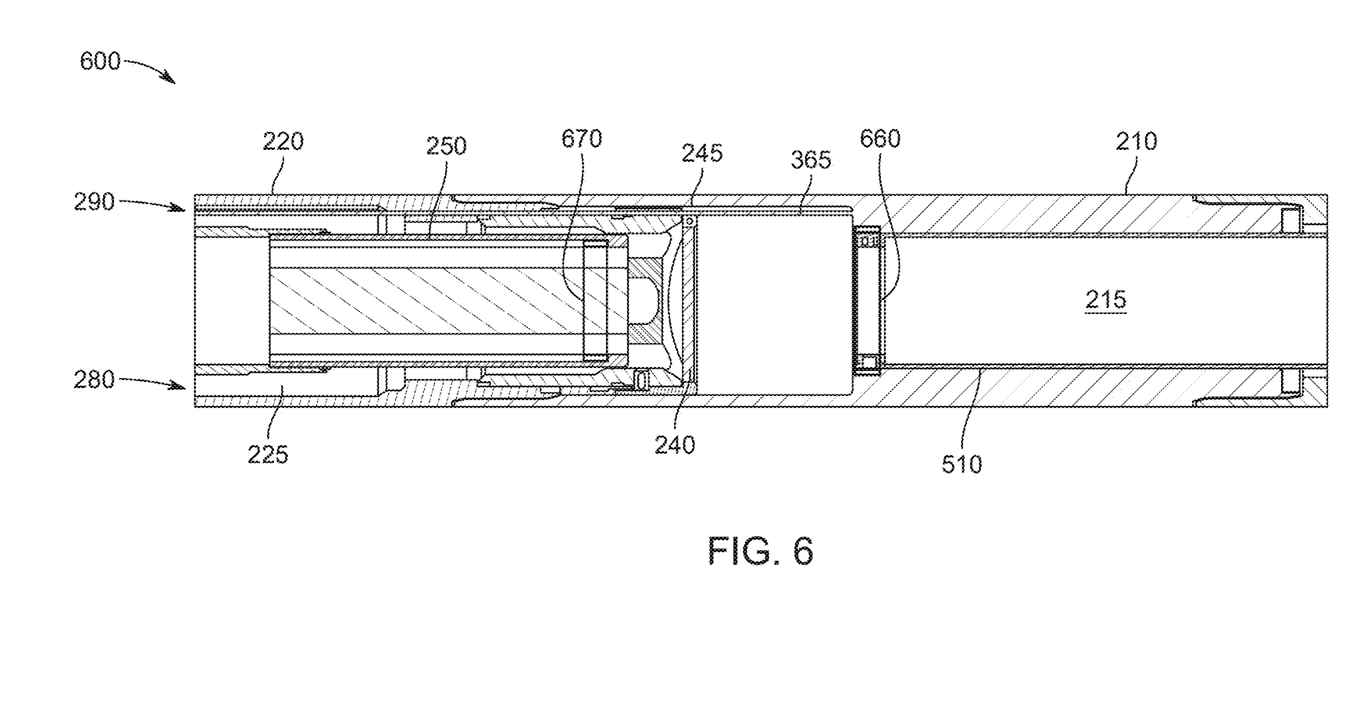
FIG. 6 illustrates one embodiment of an SSSV designed, manufactured and/or operated according to one or more alternative embodiments of the disclosure.

Turning to FIG. 6, illustrated is an SSSV 600 designed, manufactured and/or operated according to one or more alternative embodiments of the disclosure. The SSSV 600 is similar in many respects to the SSSV 500. Accordingly, like reference numbers have been used to indicate similar, if not identical, features. The SSSV 600 differs, for the most part, from the SSSV 500 in that the electromagnet 660 and/or permanent magnet/ferromagnet 670 radially extend at least 180 degrees about the outer housing 210 or the bore flow management actuator 250. In one or more embodiments, such as shown, the electromagnet 660 and/or permanent magnet/ferromagnet 670 radially extend 360 degrees about the outer housing 210 or the bore flow management actuator 250.

Figure 7:
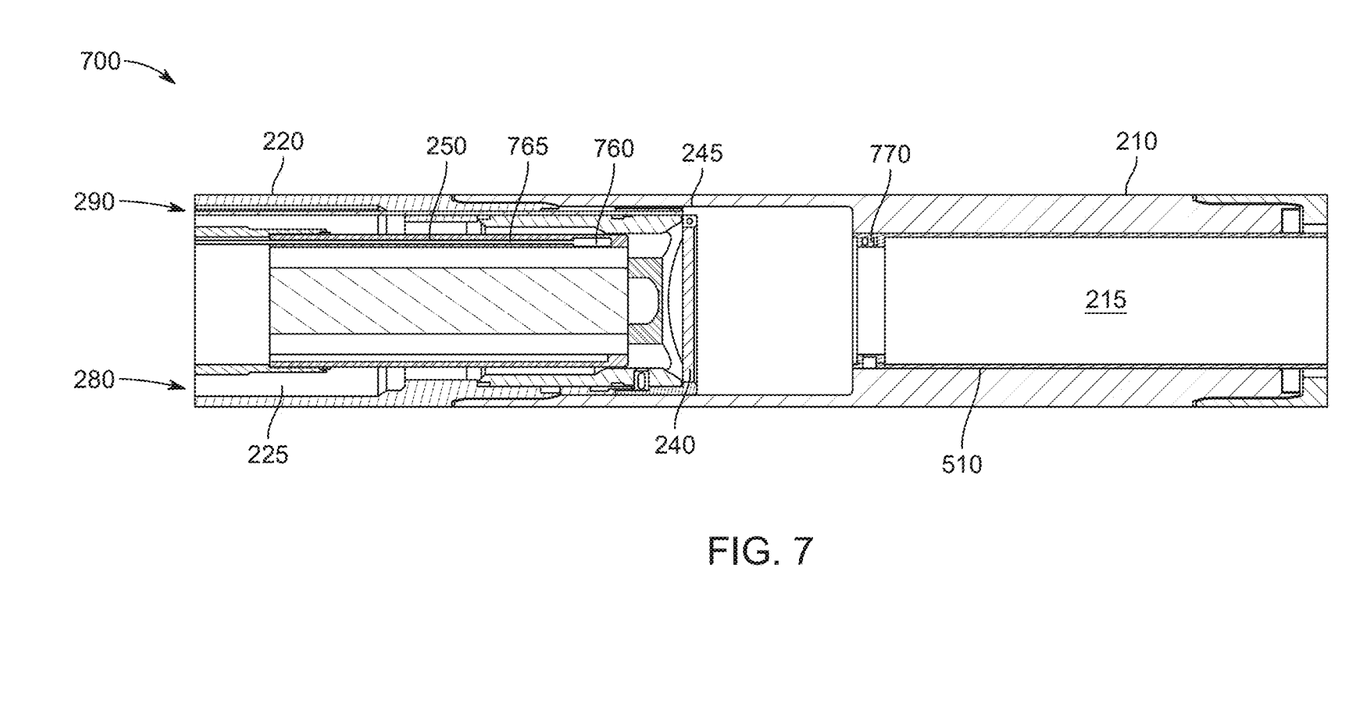
FIG. 7 illustrates one embodiment of an SSSV designed, manufactured and/or operated according to one or more alternative embodiments of the disclosure.

Turning to FIG. 7, illustrated is an SSSV 700 designed, manufactured and/or operated according to one or more alternative embodiments of the disclosure. The SSSV 700 is similar in many respects to the SSSV 500. Accordingly, like reference numbers have been used to indicate similar, if not identical, features. The SSSV 700 differs, for the most part, from the SSSV 500 in that the position of the electromagnet 760 and/or permanent magnet/ferromagnet 770 is reversed. For example, in the embodiment of FIG. 7, the electromagnet 760 is located in the second location and the permanent magnet/ferromagnet 770 is located in the first location.

In the illustrated embodiment, the electromagnet 760 is positioned within an opening in a sidewall of the bore flow management actuator 250, with the electric line 765 extending through the opening and in contact with the electromagnet 760. For example, the electric line 765 could have enough length such that it could remain connected to the electromagnet 760 while the bore flow management actuator 250 moves to its second state, but at the same time coil back up when the bore flow management actuator 250 is in its first state.

In an alternative embodiment, the electromagnet 760 could receive electric current through another physical coupling (e.g., physical contact with one or more electrical contacts as the bore flow management actuator 250 slides), and thus no electric line 765 would directly couple to the electromagnet 760 (e.g., but in turn would directly couple to the one or more electrical contacts). In yet another embodiment, the electromagnet 760 could receive electric current through inductive coupling (e.g., inductive contact as the bore flow management actuator 250 slides), and thus no physical contact is required at all. In one embodiment, the inductive coupling would not occur unless the bore flow management actuator is in its second state. These two embodiments would help relieve any actual and/or perceived issues that may exist when the electric line 765 is physically coupled to the electromagnet 760, such as might exist with an embodiment such as that shown in FIG. 7.

Figure 8:
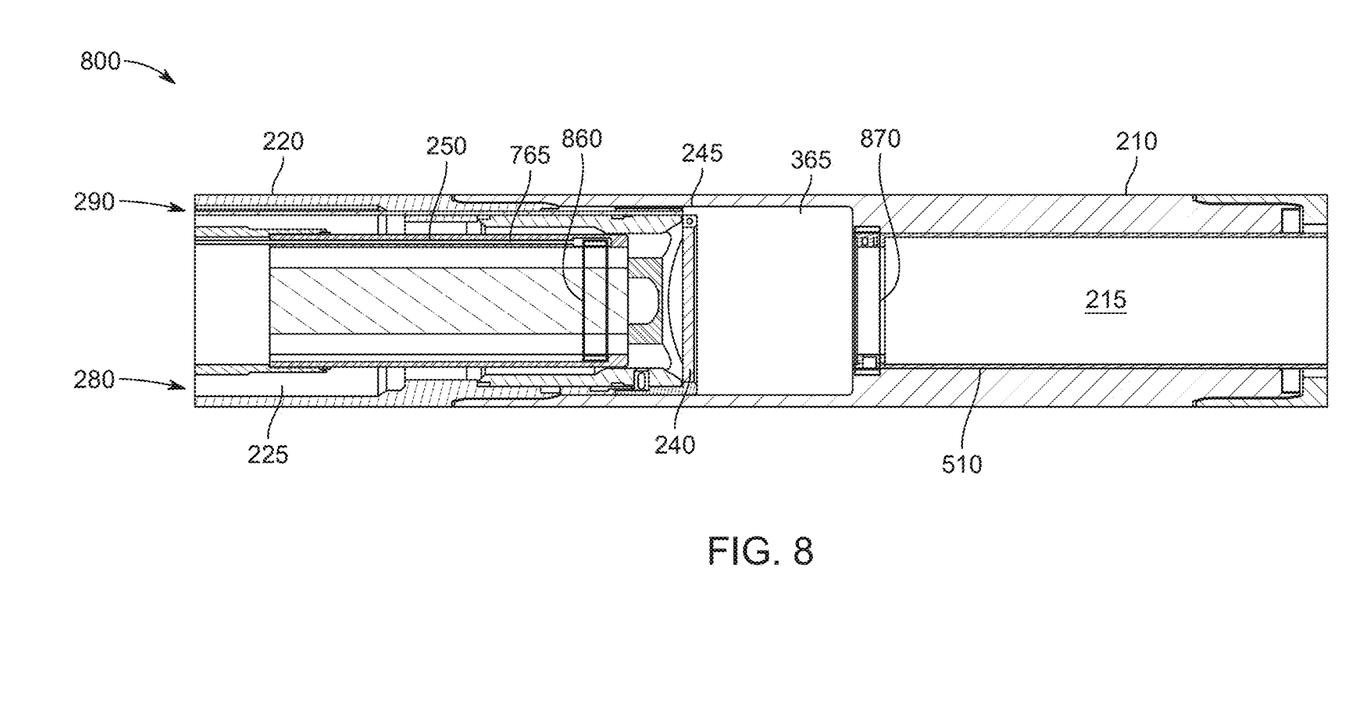
FIG. 8 illustrates one embodiment of an SSSV designed, manufactured and/or operated according to one or more alternative embodiments of the disclosure.

Turning to FIG. 8, illustrated is an SSSV 800 designed, manufactured and/or operated according to one or more alternative embodiments of the disclosure. The SSSV 800 is similar in many respects to the SSSV 700. Accordingly, like reference numbers have been used to indicate similar, if not identical, features. The SSSV 800 differs, for the most part, from the SSSV 700 in that the electromagnet 860 and/or permanent magnet/ferromagnet 870 radially extend at least 180 degrees about the outer housing 210 or the bore flow management actuator 250. In one or more embodiments, such as shown, the electromagnet 860 and/or permanent magnet/ferromagnet 870 radially extend 360 degrees about the outer housing 210 or the bore flow management actuator 250.

Aspects disclosed herein include:

A. A subsurface safety valve (SSSV), the subsurface safety valve (SSSV) including: 1) an outer housing including a central bore extending axially through the outer housing, the central bore operable to convey subsurface production fluids there through; 2) a valve closure mechanism coupled to the outer housing within the central bore; 3) a bore flow management actuator disposed in the central bore, the bore flow management actuator configured to slide from a first state to a second state to move the valve closure mechanism between a closed state and an open state; 4) an electromagnet positioned at: a) a first location, the first location in the outer housing proximate where the bore flow management actuator resides when the bore flow management actuator is in the second state; or b) a second location, the second location coupled proximate a downhole end of the bore flow management actuator; 5) a primary control system on a primary control circuit coupled to the bore flow management actuator, the primary control system configured to slide the bore flow management actuator from the first state to the second state; and 6) a safety control system on a separate safety control circuit coupled to the electromagnet, the separate safety control circuit and electromagnet configured to keep the bore flow management actuator at the second state when the electromagnet is energized and the primary control circuit is inoperable.

B. A well system, the well system including: 1) a wellbore extending through one or more subterranean formations; 2) production tubing disposed in the wellbore; 3) a subsurface safety valve (SSSV) disposed in line with the production tubing, the subsurface safety valve (SSSV) including: a) an outer housing including a central bore extending axially through the outer housing, the central bore operable to convey subsurface production fluids there through; b) a valve closure mechanism coupled to the outer housing within the central bore; c) a bore flow management actuator disposed in the central bore, the bore flow management actuator configured to slide from a first state to a second state to move the valve closure mechanism between a closed state and an open state; d) an electromagnet positioned at: i) a first location, the first location in the outer housing proximate where the bore flow management actuator resides when the bore flow management actuator is in the second state; or ii) a second location, the second location coupled proximate a downhole end of the bore flow management actuator; e) a primary control system on a primary control circuit coupled to the bore flow management actuator, the primary control system configured to slide the bore flow management actuator from the first state to the second state; and f) a safety control system on a separate safety control circuit coupled to the electromagnet, the separate safety control circuit and electromagnet configured to keep the bore flow management actuator at the second state when the electromagnet is energized and the primary control circuit is inoperable.

C. A method, the method including: 1) positioning a subsurface safety valve (SSSV) in line with the production tubing disposed in a wellbore extending through one or more subterranean formations, the subsurface safety valve (SSSV) including: a) an outer housing including a central bore extending axially through the outer housing, the central bore operable to convey subsurface production fluids there through; b) a valve closure mechanism coupled to the outer housing within the central bore; c) a bore flow management actuator disposed in the central bore, the bore flow management actuator configured to slide from a first state to a second state to move the valve closure mechanism between a closed state and an open state; d) an electromagnet positioned at a first location, the first location in the outer housing proximate where the bore flow management actuator resides when the bore flow management actuator is in the second state, or a second location, the second location coupled proximate a downhole end of the bore flow management actuator; e) a primary control system on a primary control circuit coupled to the bore flow management actuator, the primary control system configured to slide the bore flow management actuator from the first state to the second state; and f) a safety control system on a separate safety control circuit coupled to the electromagnet, the separate safety control circuit and electromagnet configured to keep the bore flow management actuator at the second state when the electromagnet is energized and the primary control circuit is inoperable; 2) sliding the bore flow management actuator from the first state to the second state to move the valve closure mechanism between the closed state and the open state using the primary control system and primary control circuit; 3) energizing the electromagnet after sliding the bore flow management actuator from the first state to the second state; and 4) making the primary control circuit inoperable with the electromagnet energized, the energized electromagnet keeping the bore flow management actuator at the second state.

Aspects A, B, and C may have one or more of the following additional elements in combination: Element 1: further including a permanent magnet positioned at the other of the second location or the first location, the permanent magnet configured to engage with the electromagnet to keep the bore flow management actuator at the second state when the electromagnet is energized and the primary control circuit is inoperable. Element 2: wherein the electromagnet is positioned at the first location and the permanent magnet is positioned at the second location. Element 3: wherein the permanent magnet is a first permanent magnet, and further including one or more additional circumferentially spaced permanent magnets. Element 4: wherein the permanent magnet radially extends at least 180 degrees about the outer housing or the bore flow management actuator. Element 5: wherein the permanent magnet radially extends 360 degrees about the outer housing or the bore flow management actuator. Element 6: further including a ferromagnet positioned at the other of the second location or the first location, the ferromagnet configured to engage with the electromagnet to keep the bore flow management actuator at the second state when the electromagnet is energized and the primary control circuit is inoperable. Element 7: wherein the electromagnet is positioned at the first location and the ferromagnet is positioned at the second location. Element 8: wherein the ferromagnet is a first ferromagnet, and further including one or more additional circumferentially spaced ferromagnets. Element 9: wherein the ferromagnet radially extends at least 180 degrees about the outer housing or the bore flow management actuator. Element 10: wherein the ferromagnet radially extends 360 degrees about the outer housing or the bore flow management actuator. Element 11: wherein the electromagnet is positioned at the first location. Element 12: further including an electric line coupled to the electromagnet, the electric line configured to provide electric current to the electromagnet. Element 13: further including a spring located in a bore in a spring housing, the spring coupled to the bore flow management actuator for returning the bore flow management actuator from the second state to the first state when the primary control circuit is inoperable, and further wherein the electric line extends along a space between an outside diameter of the spring and the bore. Element 14: wherein the outer housing includes cross-matched bores, a first bore of which extends from an outer surface of the outer housing toward the first location and a second bore of which extends from the central bore thereby crossing the first bore, the electromagnet located in the first bore and the electric line extending through the second bore to couple to the electromagnet. Element 15: wherein the electromagnet is a single discrete electromagnet. Element 16: wherein the electromagnet is a first electromagnet, and further including one or more additional circumferentially spaced electromagnets. Element 17: wherein the electromagnet radially extends at least 180 degrees about the outer housing or the bore flow management actuator. Element 18: wherein the electromagnet radially extends 360 degrees about the outer housing or the bore flow management actuator. Element 19: further including a lockout sleeve positioned within the central bore. Element 20: wherein the subsurface safety valve (SSSV) is a tubing retrievable subsurface safety valve (TRSV). Element 21: wherein the subsurface safety valve (SSSV) is a wireline retrievable subsurface safety valve (WRSV). Element 22: wherein the primary control circuit is a hydraulic primary control circuit and the separate safety control circuit is a separate electric safety control circuit. Element 23: wherein the primary control circuit is an electric primary control circuit and the separate safety control circuit is a separate electric safety control circuit. Element 24: wherein the primary control circuit is a first hydraulic control circuit, and further wherein the making the primary control circuit inoperable includes servicing the first hydraulic control circuit. Element 25: wherein the primary control circuit is a first electric control circuit, and further wherein the making the primary control circuit inoperable includes servicing the first electric control circuit.

Those skilled in the art to which this application relates will appreciate that other and further additions, deletions, substitutions and modifications may be made to the described embodiments.

What is claimed is:

1. A subsurface safety valve (SSSV), comprising:
   an outer housing including a central bore extending axially through the outer housing, the central bore operable to convey subsurface production fluids there through, wherein the outer housing includes cross-matched bores, a first bore of which extends from an outer surface of the outer housing toward a first location and a second bore of which extends from the central bore thereby crossing the first bore;
   a valve closure mechanism coupled to the outer housing within the central bore;
   a bore flow management actuator disposed in the central bore, the bore flow management actuator configured to slide from a first state to a second state to move the valve closure mechanism between a closed state and an open state;
   an electromagnet positioned at
   the first location, the first location in the outer housing proximate where a downhole end of the bore flow management actuator resides when the bore flow management actuator is in the second state;
   an electric line coupled to the electromagnet, the electric line configured to provide electric current to the electromagnet and further wherein the electromagnet is located in the first bore and the electric line extends through the second bore to couple to the electromagnet;
   a primary control system on a primary control circuit coupled to the bore flow management actuator, the primary control system configured to slide the bore flow management actuator from the first state to the second state; and
   a safety control system on a safety control circuit, separate from the primary control system on the primary control circuit, coupled to the electromagnet, the safety control circuit and electromagnet configured to keep the bore flow management actuator at the second state when the electromagnet is energized and the primary control circuit is inoperable.

2. The subsurface safety valve (SSSV) as recited in claim 1, further including a permanent magnet positioned at a second location, the second location coupled proximate the downhole end of the bore flow management actuator, the permanent magnet configured to engage with the electromagnet to keep the bore flow management actuator at the second state when the electromagnet is energized and the primary control circuit is inoperable.

3. The subsurface safety valve (SSSV) as recited in claim 2, wherein the permanent magnet is a first permanent magnet, and further including one or more additional circumferentially spaced permanent magnets.

4. The subsurface safety valve (SSSV) as recited in claim 2, wherein the permanent magnet radially extends at least 180 degrees about the bore flow management actuator.

5. The subsurface safety valve (SSSV) as recited in claim 2, wherein the permanent magnet radially extends 360 degrees about the bore flow management actuator.

6. The subsurface safety valve (SSSV) as recited in claim 1, further including a ferromagnet positioned at a second location, the second location coupled proximate the downhole end of the bore flow management actuator, the ferromagnet configured to engage with the electromagnet to keep the bore flow management actuator at the second state when the electromagnet is energized and the primary control circuit is inoperable.

7. The subsurface safety valve (SSSV) as recited in claim 6, wherein the ferromagnet is a first ferromagnet, and further including one or more additional circumferentially spaced ferromagnets.

8. The subsurface safety valve (SSSV) as recited in claim 6, wherein the ferromagnet radially extends at least 180 degrees about the bore flow management actuator.

9. The subsurface safety valve (SSSV) as recited in claim 6, wherein the ferromagnet radially extends 360 degrees about the bore flow management actuator.

10. The subsurface safety valve (SSSV) as recited in claim 1, further including a spring located in a bore in a spring housing, the spring coupled to the bore flow management actuator for returning the bore flow management actuator from the second state to the first state when the primary control circuit is inoperable, and further wherein the electric line extends along a space between an outside diameter of the spring and the bore.

11. The subsurface safety valve (SSSV) as recited in claim 1, wherein the electromagnet is a single discrete electromagnet.

12. The subsurface safety valve (SSSV) as recited in claim 1, wherein the electromagnet is a first electromagnet, and further including one or more additional circumferentially spaced electromagnets.

13. The subsurface safety valve (SSSV) as recited in claim 1, wherein the electromagnet radially extends at least 180 degrees about the outer housing or the bore flow management actuator.

14. The subsurface safety valve (SSSV) as recited in claim 1, wherein the electromagnet radially extends 360 degrees about the outer housing or the bore flow management actuator.

15. The subsurface safety valve (SSSV) as recited in claim 1, further including a lockout sleeve positioned within the central bore.

16. A well system, comprising:
a wellbore extending through one or more subterranean formations;
production tubing disposed in the wellbore;
a subsurface safety valve (SSSV) disposed in line with the production tubing, the subsurface safety valve (SSSV) including:
an outer housing including a central bore extending axially through the outer housing, the central bore operable to convey subsurface production fluids there through, wherein the outer housing includes cross-matched bores, a first bore of which extends from an outer surface of the outer housing toward a first location and a second bore of which extends from the central bore thereby crossing the first bore;
a valve closure mechanism coupled to the outer housing within the central bore;
a bore flow management actuator disposed in the central bore, the bore flow management actuator configured to slide from a first state to a second state to move the valve closure mechanism between a closed state and an open state;
an electromagnet positioned at
the first location, the first location in the outer housing proximate where a downhole end of the bore flow management actuator resides when the bore flow management actuator is in the second state;
an electric line coupled to the electromagnet, the electric line configured to provide electric current to the electromagnet, and further wherein the electromagnet is located in the first bore and the electric line extends through the second bore to couple to the electromagnet;
a primary control system on a primary control circuit coupled to the bore flow management actuator, the primary control system configured to slide the bore flow management actuator from the first state to the second state; and
a safety control system on a safety control circuit, separate from the primary control system on the primary control circuit, coupled to the electromagnet, the safety control circuit and electromagnet configured to keep the bore flow management actuator at the second state when the electromagnet is energized and the primary control circuit is inoperable.

17. The well system as recited in claim 16, further including a permanent magnet positioned at a second location, the second location coupled proximate the downhole end of the bore flow management actuator, the permanent magnet configured to engage with the electromagnet to keep the bore flow management actuator at the second state when the electromagnet is energized and the primary control circuit is inoperable.

18. The well system as recited in claim 16, further including a ferromagnet positioned at a second location, the second location coupled proximate the downhole end of the bore flow management actuator, the ferromagnet configured to engage with the electromagnet to keep the bore flow management actuator at the second state when the electromagnet is energized and the primary control circuit is inoperable.

19. The well system as recited in claim 16, further including a spring located in a bore in a spring housing, the spring coupled to the bore flow management actuator for returning the bore flow management actuator from the second state to the first state when the primary control circuit is inoperable, and further wherein the electric line extends along a space between an outside diameter of the spring and the bore.

20. The well system as recited in claim 16, wherein the electromagnet radially extends 360 degrees about the outer housing.

21. The well system as recited in claim 16, further including a lockout sleeve positioned within the central bore.

22. The well system as recited in claim 16, wherein the subsurface safety valve (SSSV) is a tubing retrievable subsurface safety valve (TRSV).

23. The well system as recited in claim 16, wherein the subsurface safety valve (SSSV) is a wireline retrievable subsurface safety valve (WRSV).

24. The well system as recited in claim 16, wherein the primary control circuit is a hydraulic primary control circuit and the safety control circuit is an electric safety control circuit.

25. The well system as recited in claim 16, wherein the primary control circuit is an electric primary control circuit and the safety control circuit is an electric safety control circuit.

26. A method, comprising:
positioning a subsurface safety valve (SSSV) in line with the production tubing disposed in a wellbore extending through one or more subterranean formations, the subsurface safety valve (SSSV) including:
an outer housing including a central bore extending axially through the outer housing, the central bore operable to convey subsurface production fluids there through, wherein the outer housing includes cross-matched bores, a first bore of which extends from an outer surface of the outer housing toward a first location and a second bore of which extends from the central bore thereby crossing the first bore;

a valve closure mechanism coupled to the outer housing within the central bore;

a bore flow management actuator disposed in the central bore, the bore flow management actuator configured to slide from a first state to a second state to move the valve closure mechanism between a closed state and an open state;

an electromagnet positioned at the first location, the first location in the outer housing proximate where a downhole end of the bore flow management actuator resides when the bore flow management actuator is in the second state;

an electric line coupled to the electromagnet, the electric line configured to provide electric current to the electromagnet, and further wherein the electromagnet is located in the first bore and the electric line extends through the second bore to couple to the electromagnet;

a primary control system on a primary control circuit coupled to the bore flow management actuator, the primary control system configured to slide the bore flow management actuator from the first state to the second state; and a safety control system on a safety control circuit, separate from the primary control system on the primary control circuit, coupled to the electromagnet, the safety control circuit and electromagnet configured to keep the bore flow management actuator at the second state when the electromagnet is energized and the primary control circuit is inoperable;

sliding the bore flow management actuator from the first state to the second state to move the valve closure mechanism between the closed state and the open state using the primary control system and primary control circuit;

energizing the electromagnet after sliding the bore flow management actuator from the first state to the second state; and making the primary control circuit inoperable with the electromagnet energized, the energized electromagnet keeping the bore flow management actuator at the second state.

27. The method as recited in claim 26, wherein the primary control circuit is a first hydraulic control circuit, and further wherein the making the primary control circuit inoperable includes servicing the first hydraulic control circuit.

28. The method as recited in claim 26, wherein the primary control circuit is a first electric control circuit, and further wherein the making the primary control circuit inoperable includes servicing the first electric control circuit.

29. The subsurface safety valve (SSSV) as recited in claim 1, wherein the first location is located downhole of at least a portion of the valve closure mechanism.

30. The subsurface safety valve (SSSV) as recited in claim 1, wherein the first location is located downhole of an entirety of the valve closure mechanism.

* * * * *